Jan. 10, 1956 W. H. BOKENKROGER 2,730,295
HEAT SEALED BAG
Filed Oct. 2, 1952 2 Sheets-Sheet 2

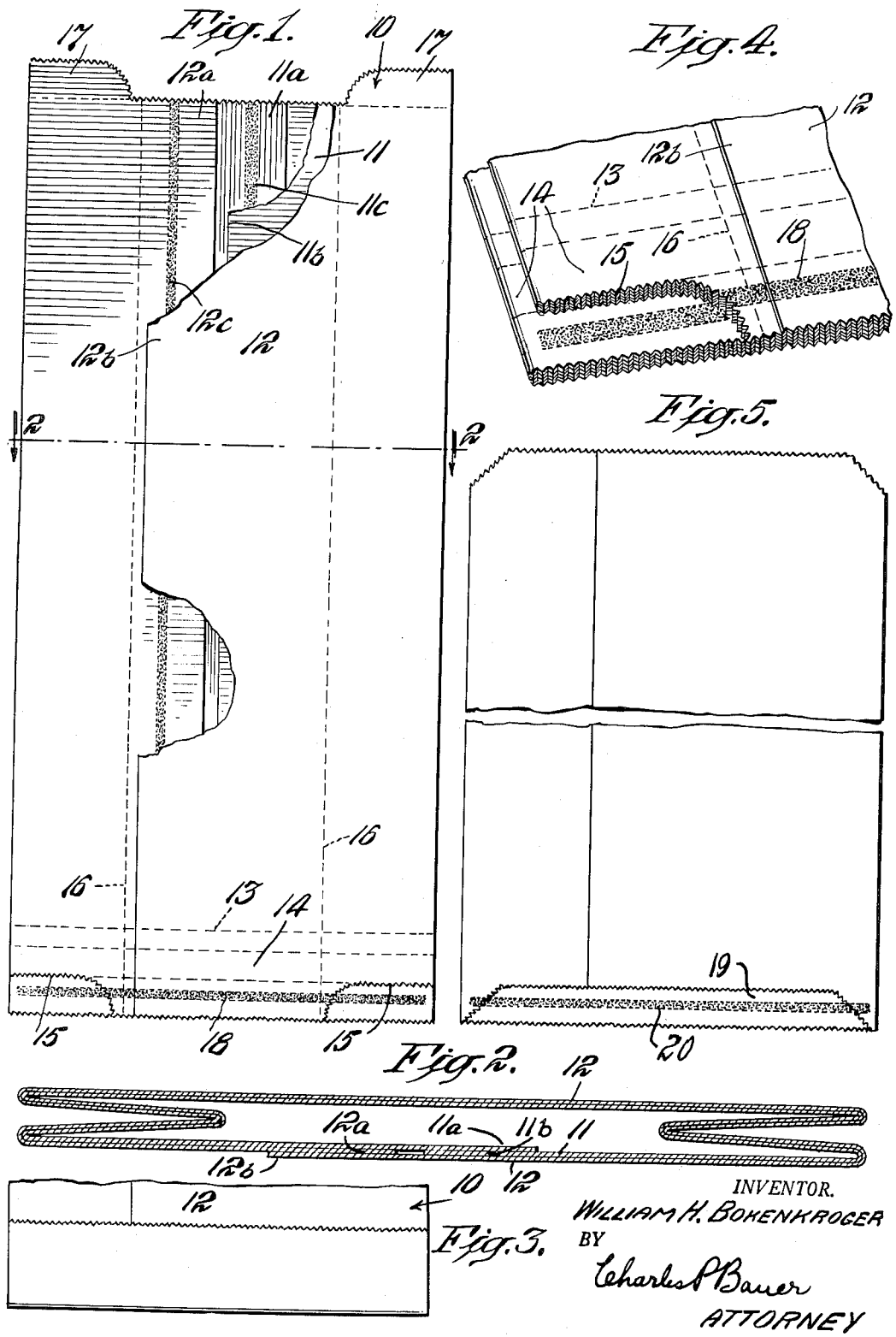

INVENTOR.
WILLIAM H. BOKENKROGER
BY Charles P. Bauer
ATTORNEY

United States Patent Office 2,730,295
Patented Jan. 10, 1956

2,730,295

HEAT SEALED BAG

William H. Bokenkroger, Hudson Falls, N. Y., assignor to Union Bag & Paper Corporation, New York, N. Y., a corporation of New Jersey Application October 2, 1952, Serial No. 312,769

4 Claims. (Cl. 229—57)

The present invention relates to improvements in heat sealed bags. More particularly it pertains to a square bag having cut-outs which facilitate securing of the bottom flap and improve the bottom or end closure.

In manufacturing paper bags of the square type each bag tube is cut successively from a continuous gusseted flat tube so that the top cut-off of one becomes the bottom cut-off of the next. This cut-off is made to provide an extension or lip on one side at the top of the bag tube which results in a corresponding cut-back or reverse cut on the same side at the bottom of the bag tube. Paste is applied to the cut-back portion and the longer side or flap of the tube is folded over the cut-back to form the bottom. It is evident that this type of cut-off is made primarily to provide a "pasting surface" to complete the bottom. However where a bag tube has an inner layer or coating of a heat sealable material, such as, for example, polyethylene, plasticized polyvinyl chloride, e. g. "Koroseal," halogenated rubber sheeting, e. g. "Pliofilm," and films formed of thermoplastic synthetic resins, such as a copolymer of vinyl chloride and vinyl acetate, e. g. "Vinylite" sheeting, and the like, it will be seen that the usual cut-off exposes such heat sealable material at the cut-back portion of the bottom. This immediately creates a problem since special adhesives are required to paste this heat sealable surface to the side of the bag to form the bottom. For instance, in the case of polyethylene it is necessary to employ a rubber base adhesive, which is expensive and very difficult to handle. Because of its extreme tackiness it is a nuisance in the paste dishes and on the other portions of the equipment with which it comes in contact. Since the advent of new heat sealable materials, it has been felt that it would be a distinct advantage to overcome this difficulty and it is accomplished by means of the present invention.

Other objects and advantages of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Figure 1 is a plan view of a gusseted tube, partly broken away and prior to turning up the end portion to form a bag embodying the present invention;

Figure 2 is a sectional view on a somewhat enlarged scale taken along the line 2—2 of Figure 1;

Figure 3 is a plan view of the bottom end of the tube of Figure 1 with the end portion folded and pasted;

Figure 4 is a perspective view of a corner of the bottom end of the tube of Figure 1;

Figure 5 is a plan view of a bag tube illustrating a conventional cut-off, prior to turning up the bottom;

Figure 6:
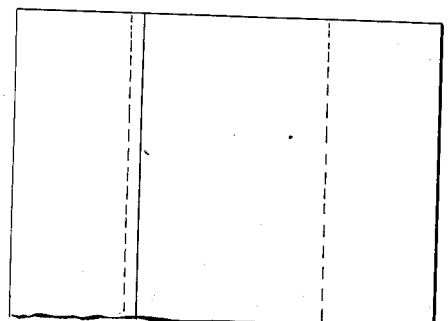
Figure 6 is a plan view of a tube with a modified form of cut-out, prior to turning up the end portion to form a bag embodying the present invention.

Referring more particularly to the drawings there is shown in Figures 1 and 2 a duplex bag tube 10 having plies 11 and 12, with appropriate side folds and gussets. The inner ply 11 is coated on the inside surface with a heat sealable material and has its overlapping marginal edges 11a and 11b secured together with adhesive 11c to form a longitudinal seam. Similarly the outer ply 12, which is uncoated, has its overlapping marginal edges 12a and 12b secured together with adhesive 12c to form a longitudinal seam. Such plies are usually held in their relative positions by spot pasting. The tube is provided with a fold or crease line 13 along which the end portion of the tube may be folded to form the bottom. The tube is closed at the end by a band of heat sealing 14.

As shown in Figures 1 and 4, the bottom cut-off of the tube runs straight across except for a cut-out 15 on each side of the end portion through the upper wall of the tube and the upper portions of the gusset. Such cut-out is confined to the gusset area, that is between the outer edge of the tube and the depth of the gusset indicated by the fold line 16, and cannot extend above the top edge of the heat seal band 14, although it can run into it. If the cut-out runs beyond such boundaries, it will either expose the heat sealable surface, thereby creating the pasting difficulties mentioned above, or cause leakage above the heat seal band. By employing the method described above of cutting the bags successively from a continuous gusseted tube, it will be seen that such cut-outs result in extensions 17 in the upper portions of the gussets at the top end of the tube. In other words the cut-outs at the bottom form corresponding extensions on the same side of the tube at the top. If the extensions at the top of the bag are objectionable for any reason, they may be cut off to provide a flush-cut top.

To complete the bag bottom, adhesive is applied, as shown at 18, and the end portion of the tube is folded upwardly along the fold or crease line 13. This results in the folded and pasted bottom illustrated in Figure 3. In some cases it has been found advantageous in spot pasting the plies to each other to place some adhesive in the area between the cut-outs 15 near the bottom end of the tube. This causes the outer ply to lie flush against the bag face in the finished bag. Of course where the heat sealing band extends to the bottom end of the tube extra adhesive in such area is unnecessary.

It will be seen in Figure 5 that a similar bag tube with a conventional cut-off has the heat sealable surface entirely exposed in the cut-back area 19 at the bottom of the tube. This consequently requires that the adhesive shown by the band 20 must be a special type to secure the heat sealable material to the side of the bag when the bottom is formed. This disadvantage is effectively overcome by the present invention.

Figure 8:
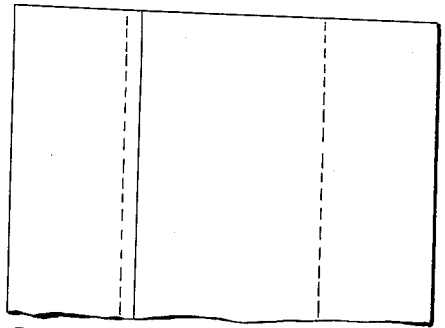
Figure 8 is a plan view of a tube with a further modified form of cut-out, prior to turning up the end portion to form a bag embodying the present invention.
Figure 7:
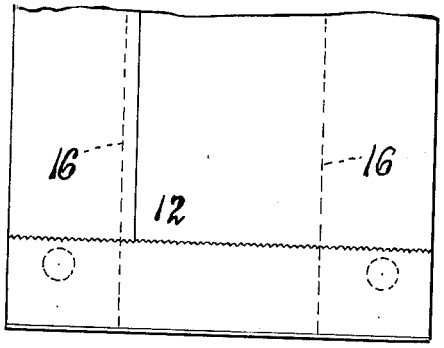
Figure 7 is a plan view of the bottom end of the tube of Figure 6 with the end portion folded and pasted.
Figure 9:
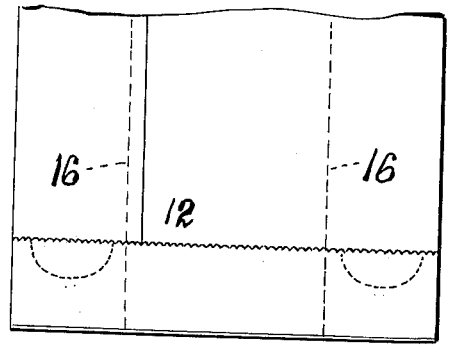
Figure 9 is a plan view of the bottom end of the tube of Figure 8 with the end portion folded and pasted.

Figures 6 and 8 each show a modified form of cut-out 15 which can be provided on each side of the end portion through the upper wall of the tube and the upper portions of the gussets, such cut-outs being circular in the tube of Figure 6 and semi-circular in the tube of Figure 8. It will be understood that these cut-outs may assume any configuration, the primary purpose being to expose the lower portions of the gussets so that such portions may be adhesively secured to the upper wall when the end portion is folded over the cut-outs and secured to form the bottom or end closure. Figures 7 and 9 show the bottom ends of the tubes of Figures 6 and 8 with the end portions folded and pasted.

In the illustrated embodiments of the invention, a duplex bag is shown with the inner surface of the inner ply coated with heat sealable material. It will be understood that the present invention is equally applicable to a single ply bag having its inside surface or a portion thereof so coated, to laminated bags or any bags involving the pasting difficulties mentioned above.

From the foregoing description and accompanying drawings it will be apparent that the cut-outs of the present invention are a distinct improvement over that shown in the conventional square bag of Figure 5, particularly where heat sealing is to be employed. Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A bag formed from a gusseted tube with a heat sealable inner surface and comprising upper and lower walls, an end portion, a transverse heat seal in the end portion closing the tube, and cut-outs in one wall on each side of the end portion through the said wall and the halves of the gussets adjacent and connected to the said wall, said cut-outs being located in the gusset area and extending from the bottom edge of the tube to below the top edge of the heat seal with all walls along the bottom edge flush cut except at such cut-outs, the end portion being folded over the cut-outs and adhesively secured to the wall to form an end closure.

2. A bag formed from a gusseted tube with a heat sealable inner surface at least adjacent the end of the tube to be closed and comprising upper and lower walls, an end portion, a transverse heat seal in the end portion closing the tube, and cut-outs in one wall on each side of the end portion through said wall and the halves of the gussets adjacent and connected to the said wall, said cut-outs being located in the gusset area and extending from the bottom edge of the tube to below the top edge of the heat seal with all walls along the bottom edge flush cut except at such cut-outs, the end portion being folded over the cut-outs and adhesively secured to the wall to form an end closure.

3. A bag formed from a gusseted tube with a heat sealable inner surface and comprising upper and lower walls, a transverse fold line defining an end portion of the tube, a transverse heat seal in the end portion closing the tube, and cut-outs in one wall on each side of the end portion through said wall and the halves of the gussets adjacent and connected to the said wall, said cut-outs being located in the gusset area and extending from the bottom edge of the tube to below the top edge of the heat seal with all walls along the bottom edge flush cut except at such cut-outs, the end portion being folded along the fold line over the cut-outs and adhesively secured to the wall to form an end closure.

4. A bag formed from a gusseted tube with a heat sealable inner surface at least adjacent the end of the tube to be closed and comprising upper and lower walls, a transverse fold line defining an end portion of the tube, a transverse heat seal between the fold line and the end of the tube closing the tube, cut-outs in the upper wall on each side of the end portion through the said wall and the upper halves of the gussets adjacent and connected to the said wall, said cut-outs being located in the gusset area and extending from the bottom edge of the tube to below the top edge of the heat seal with all walls along the bottom edge flush cut except at such cut-outs, and a transverse line of adhesive on the upper wall adjacent the lower end of the tube, the end portion being folded over along the fold line and secured to the upper wall to complete the end closure.

References Cited in the file of this patent

UNITED STATES PATENTS

| | | |
|---|---|---|
| 392,964 | McCulla | Nov. 13, 1888 |
| 1,988,462 | Royal | Jan. 22, 1935 |
| 2,062,618 | Sterling | Dec. 1, 1936 |
| 2,078,467 | Sterling | Apr. 27, 1937 |
| 2,312,280 | Avery | Feb. 23, 1943 |
| 2,333,440 | Potdevin | Nov. 2, 1943 |